Figure 4A:
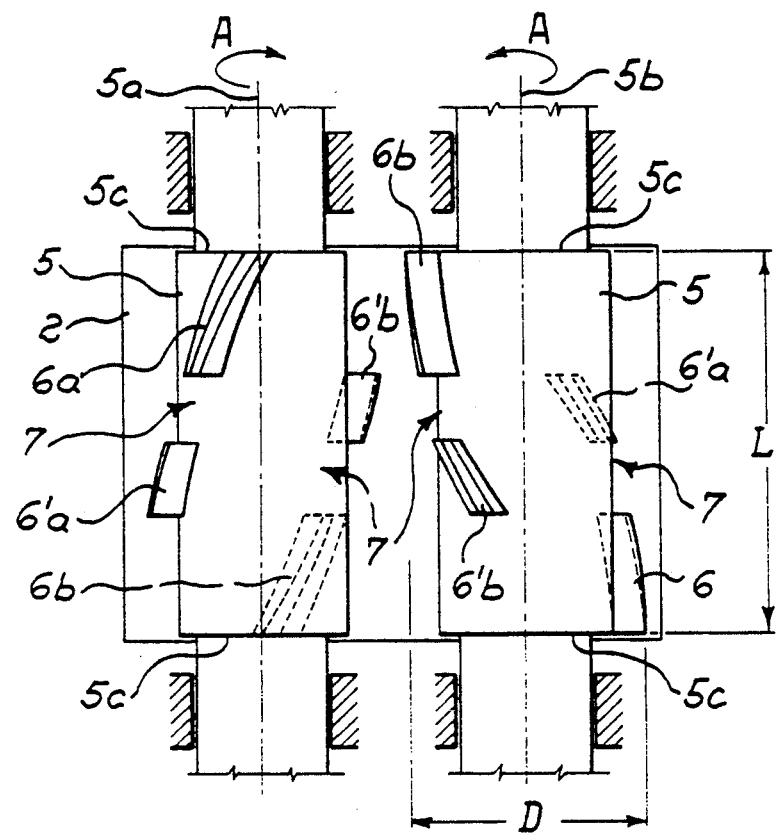

United States Patent [19]

Passoni

[11] Patent Number: 5,297,935
[45] Date of Patent: Mar. 29, 1994

[54] ROTOR HAVING AT LEAST ONE SPLIT BLADE PARTICULARLY FOR MIXING MACHINES OF INTERNAL TYPE

[75] Inventor: Gian C. Passoni, Monza, Italy

[73] Assignee: Pomini Farrel S.P.A., Italy

[21] Appl. No.: 998,409

[22] Filed: Dec. 29, 1992

[30] Foreign Application Priority Data

Jan. 21, 1992 [IT] Italy .................. MI92A 000094

[51] Int. Cl.$^5$ .............................................. F01D 5/12
[52] U.S. Cl. ...................... 416/183; 366/85; 366/300
[58] Field of Search ............... 416/176, 183, 231 A; 366/84, 85, 90, 296, 300, 301

[56] References Cited

U.S. PATENT DOCUMENTS

| | | | |
|---|---|---|---|
| 3,884,451 | 5/1975 | Stenmark et al. | 366/90 |
| 3,891,192 | 6/1975 | Bontempi et al. | 366/90 |
| 4,103,355 | 7/1978 | Weber | 366/90 |
| 4,178,104 | 12/1979 | Menges et al. | 366/90 |
| 4,234,259 | 11/1980 | Wiedmann et al. | 366/300 |
| 4,744,668 | 5/1988 | Nortey | 366/300 |
| 5,000,900 | 3/1991 | Baumgarter | 366/85 |
| 5,215,764 | 6/1993 | Davis et al. | 366/90 |

Primary Examiner—John T. Kwon
Attorney, Agent, or Firm—Ladas & Parry

[57] ABSTRACT

A rotor (5) particularly for mixing machines of internal type (1) for elastomers and plastomers, equipped with at least one pair of blades (6) each projecting from the cylindrical hub of rotor (5) starting from flank (5c) of the rotor and set helically thereon, in which at least one of such blades (6) has at least one split delimited by two blade sections (6a, 6'a; 6b, 6'b; 8a, 8'a; 8b, 8'b; 10a, 10'a) located parallel to one another, one section (6a, 6b, 8a, 8b, 10a) having one of its ends located at flank (5c) of rotor (5) and at least one section (6a, 6'b, 8'a, 8'b, 10'a) being separated from the previous one or located on the same helix or on parallel helices to create at least one passage opening (7) capable of bringing about diversion of the flow of material during mixing.

8 Claims, 6 Drawing Sheets

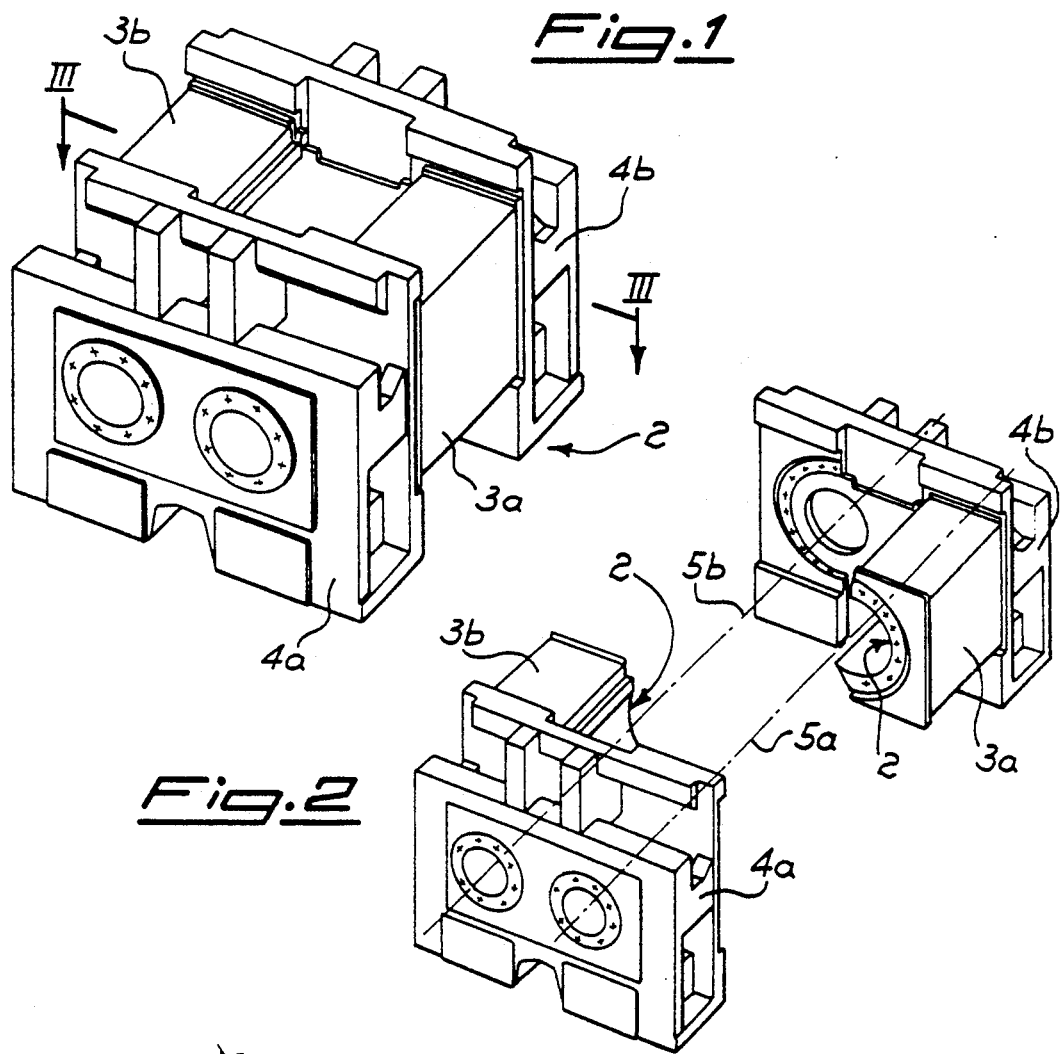
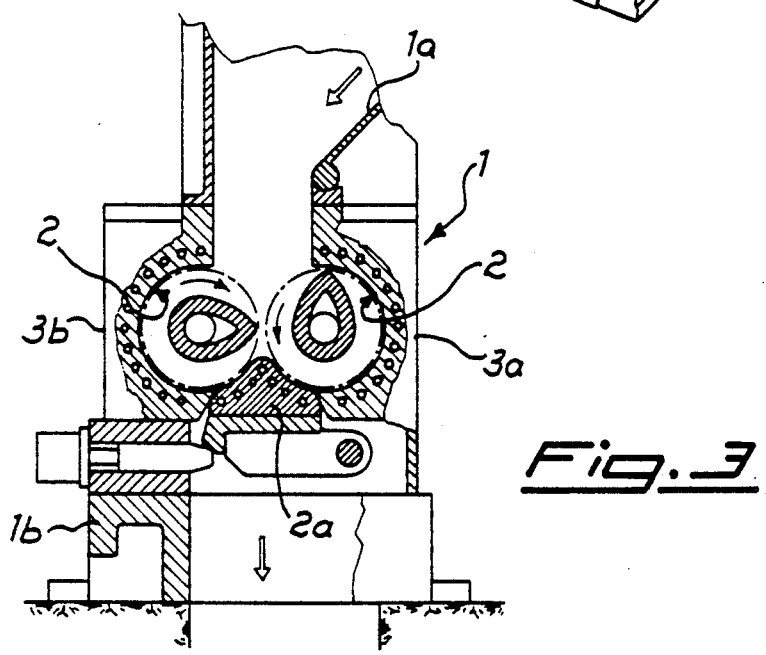

ROTOR HAVING AT LEAST ONE SPLIT BLADE PARTICULARLY FOR MIXING MACHINES OF INTERNAL TYPE

The object of this invention is a rotor particularly for mixing machines of internal type comprising at least one split blade to create openings capable of bringing about diversion of the flow of material during mixing thereof.

It is known that in rubber and plastics processing technology there are used, to obtain a mixture capable of being transformed into a finished or semi-finished product, mixing machines of the so-called internal mixer type, in which (FIGS. 1, 2, 3) is formed a mixing chamber within which rotate two rotors with parallel axes, which may for example be of the tangential type, that is, of a type which operates tangentially relative to the walls of the mixing chamber, the two rotors being capable of interpenetrating or of not interpenetrating in relation to one another.

The purpose of such rotors is basically to effect microdispersal or incorporation of the processed material, which for simplicity will be known hereinafter as the mixture, together with evening out thereof to render the mixture as homogeneous as possible throughout its mass, however distributed. To such end the movement which the rotation of the rotors should impart to the mixture is substantially of three types: flow according to circumferences centred on the axis of rotation by circumferential movement of the layers of mixture; radial flow by movement of the layers of mixture from/to the axis of rotation to/from the walls of the chamber, and lastly flow according to directions parallel to the axis of rotation.

It is also known that numerous attempts have been made to develop rotor configurations which bring about such results; in particular there are known rotors with a variable number of blades, typically two or four, with various lengths and angular arrangements thereof; further attempts have involved changing the system of rotation of the rotors from conditions of asynchronism to conditions of synchronism.

Such solutions, however, have not represented an effective improvement of all the characteristics required from these types of machines. There is therefore posed the technical problem of developing a rotor for machines for mixing rubber and plastic materials, particularly of the so-called internal mixer type, capable of allowing optimization of the flows of movement of the mixture within the mixing chamber during the mixing operations.

Such rotor should moreover make it possible to graduate the efforts due to the action of the blades because of the resistance offered by the mixture, in order to allow regulation of the power required so as not to necessitate oversizing of the moving parts of the machine and an undesirable increase in power input.

Such results are obtained from the present invention, which provides a rotor particularly for mixing machines of internal type for elastomers and plastomers, equipped with at least one pair of blades each projecting from the cylindrical hub of the rotor starting at the flank of the rotor and set helically thereon, in which at least one of such blades has at least one split delimited by two blade sections parallel to one another, one section having one of its ends located at the flank of the rotor and at least one section being separated from the previous one or located on the same helix or on parallel helices to create at least one opening capable of bringing about diversion of the flow of material during mixing.

According to an initial implementation of the rotor, the said blade sections detached from the flank of the rotor are remote from the blade section having one end located at the flank and lie on the same helix of such blade section.

In an alternative initial implementation such blade sections remote from the flank are moved relative to direction (A) of rotation of the rotor on a helix parallel to that of the blade section having its end located at the flank.

According to this invention provision is also made for the blade sections remote from the flanks to be moved either according to the same helix or according to a helix parallel to that of the blade section having its end located at the flank of the rotor; such movement may be effected on helices located parallel in the sense corresponding to direction (A) of rotation of the rotor, or on helices located parallel in the sense contrary to direction (A) of rotation of the rotor.

Figure 4B:
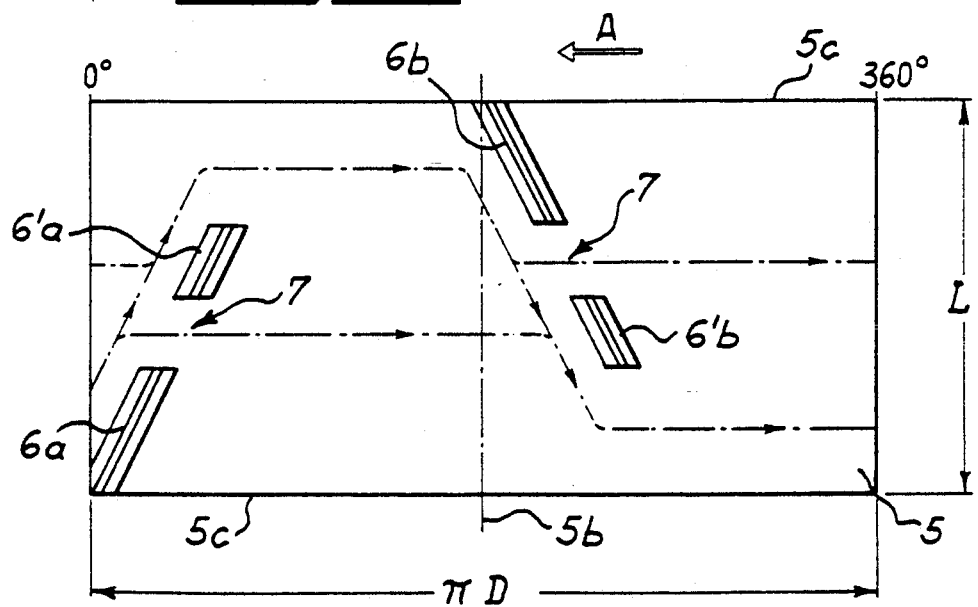
Figure 5A:
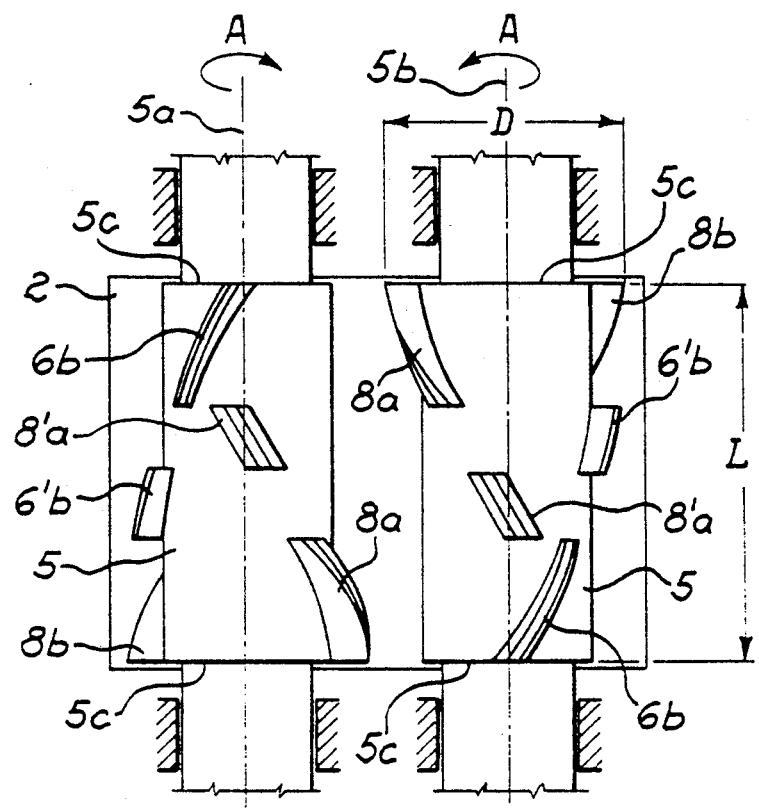
Figure 5B:
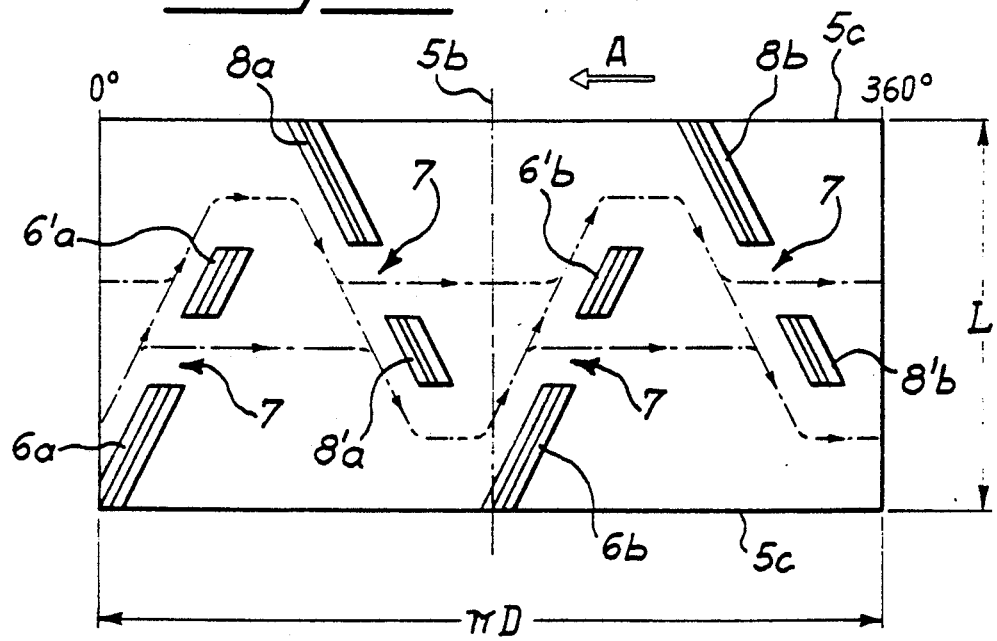
Figure 6A:
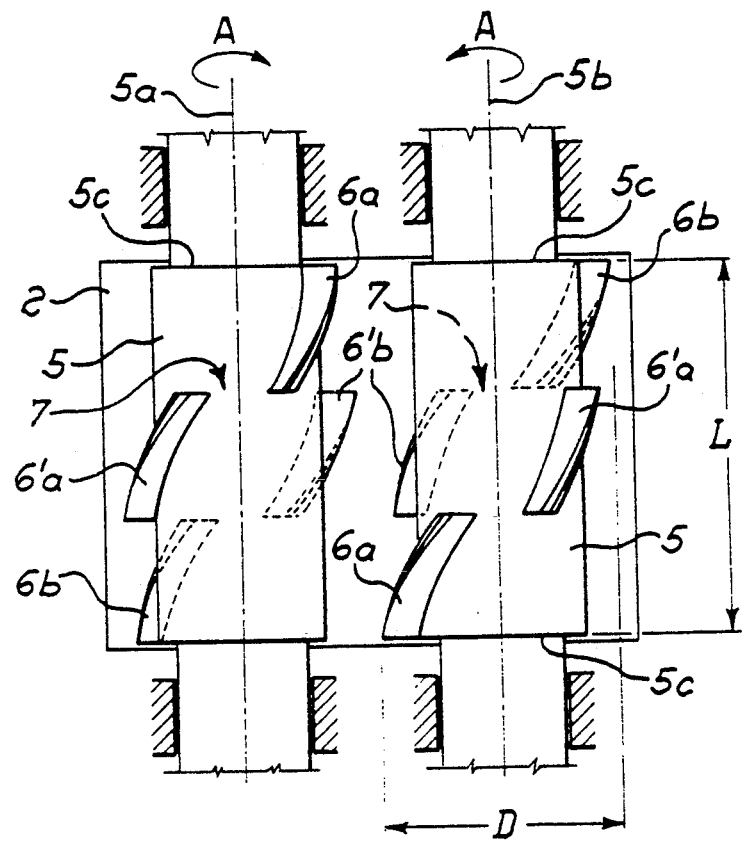
Figure 6B:
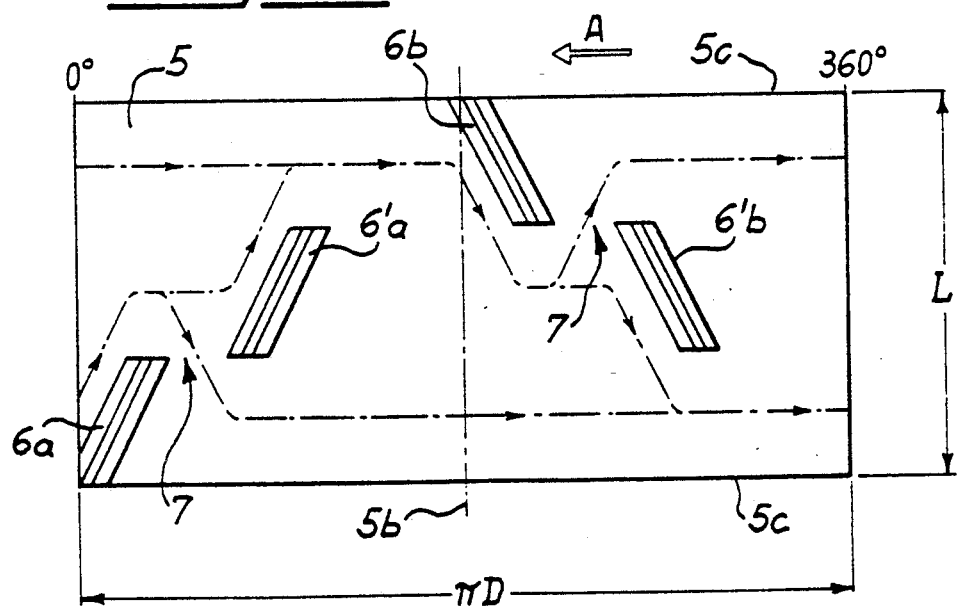
Figure 7A:
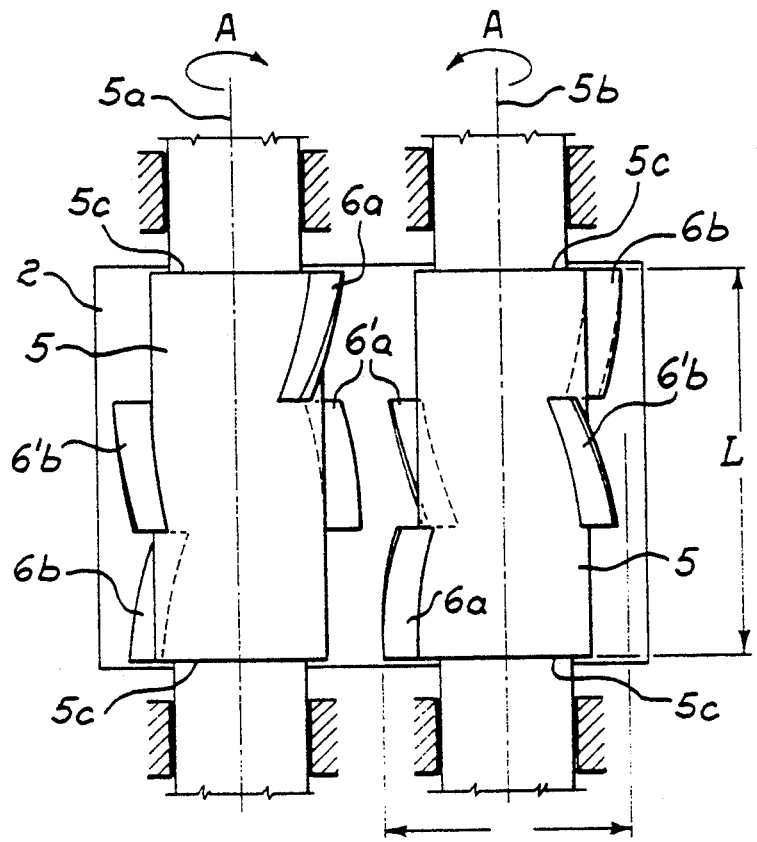
Figure 7B:
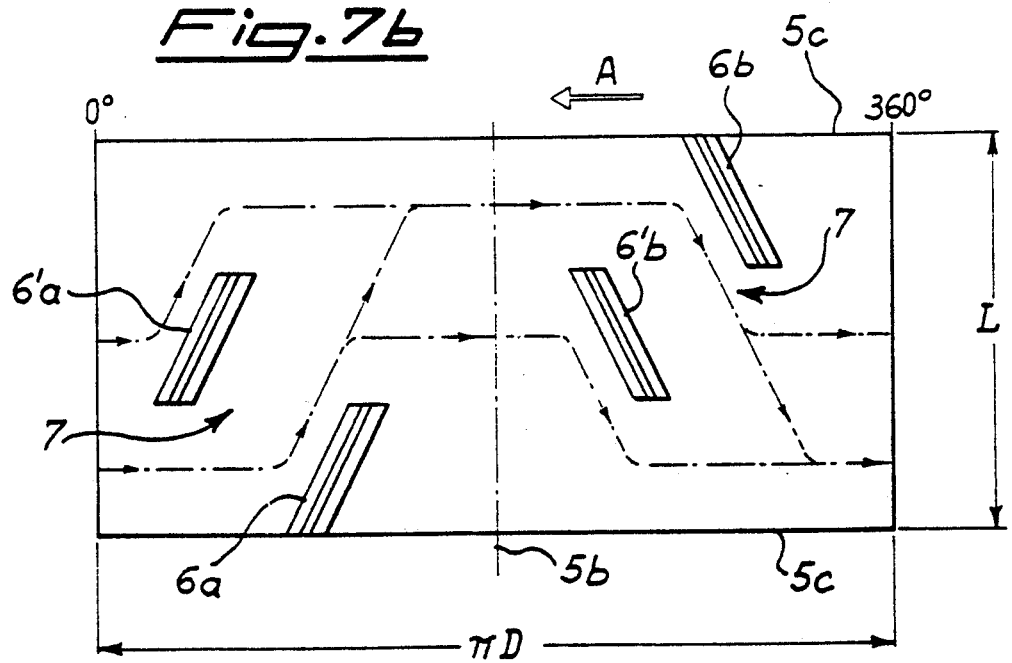
Figure 8A:
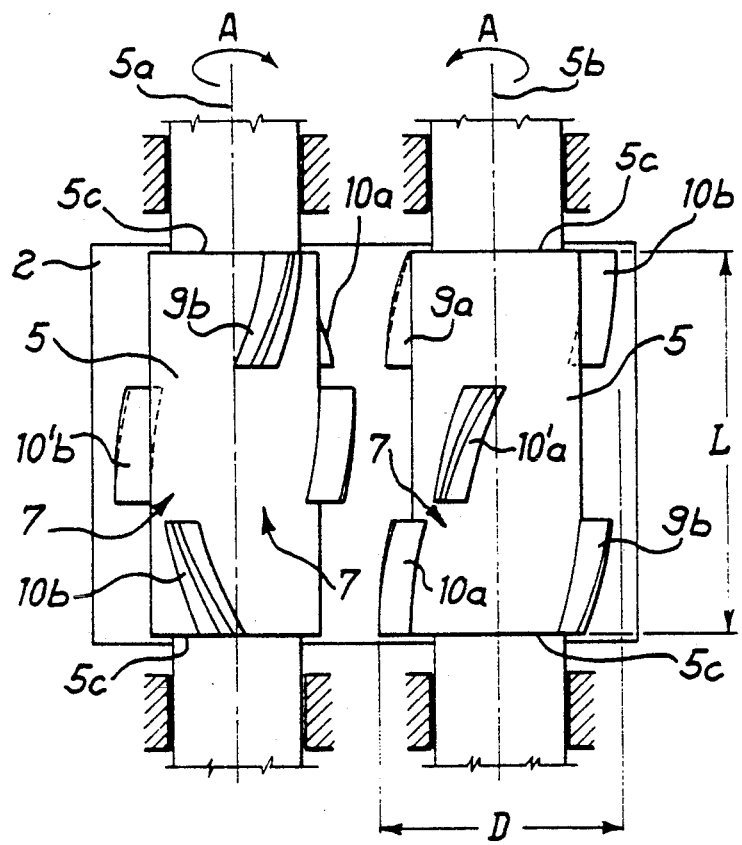
Figure 8B:
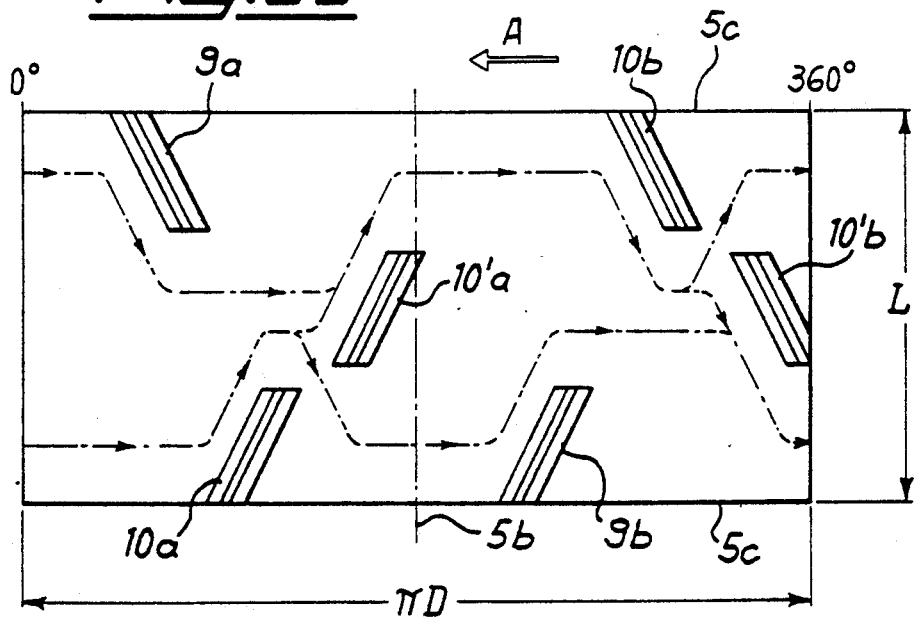

Further details may be obtained from the following description with reference to the attached drawings, which show:

In FIG. 1: an axonometric representation of a mixing chamber of an internal mixer;

In FIG. 2: the mixing chamber of FIG. 1 shown in exploded view;

In FIG. 3: a sectional view according to plane III—III of FIG. 1 of an internal mixer;

In FIGS. 4a, 4b: an example of implementation of a two-bladed rotor according to this invention shown in plan view and according to the geometrical development respectively;

In FIGS. 5a, 5b: an example of implementation of a four-bladed rotor according to this invention shown in plan view and according to the geometrical development respectively;

In FIGS. 6a, 6b: an example of an alternative implementation of a two-bladed rotor according to this invention shown in plan view and according to the geometrical development respectively;

In FIGS. 7a, 7b: a further example of implementation of a two-bladed rotor according to this invention shown in plan view and according to the geometrical development respectively;

In FIGS. 8a, 8b: a further example of implementation of a four-bladed rotor according to this invention shown in plan view and according to the geometrical development respectively.

As shown in FIGS. 1, 2, 3, a mixing machine of internal type 1 comprises an upper loading part 1a, a mixing chamber 2 and a base 1b with a door 2a providing access to the mixing chamber for unloading the mixture at the end of the cycle.

Chamber 2 is in particular formed of two walls 3a, 3b and two shoulders 4a, 4b which define the typical conformation of intersecting circumferences of mixing chamber 2 (FIG. 3).

Inside such chambers are located, according to rotation axes 5a, 5b, in parallel and in a manner which is self-evident and therefore not illustrated in detail, substantially cylindrical rotors 5 of length L and diameter D.

As shown in FIGS. 4a, 4b, an initial example of implementation of a rotor according to this invention provides for rotor 5 itself to be equipped with two blades 6a, 6b, both originating from the profile located at flanks 5c of rotor 5 and arranged opposite one another. As can be seen, both blades 6a, 6b have a split intended to create an opening 7 between two successive sections 6a, 6'a and 6b, 6'b of the same blade, and on the same helix, in order to bring about the passage of the mixture either forward or rearward along the route which runs parallel to axes 5a, 5b during mixing.

In FIGS. 5a, 5b is shown a rotor 5 with four long blades 6a, 6b, 8a, 8b, arranged opposite one another and all having a split profile to define openings 7 which, as shown by a dotted line, provide routes for the mixture capable of creating a diversion, and therefore a movement thereof, thus bringing about an improvement of mixing and the obtention of more homogeneous mixtures in relation to the entire mass. Also in this case opening 7 is located between the respective pairs of blade sections 6a,6'a; 6b,6'b; 8a,8'a; 8b,8'b lying on the same helix. With reference to FIGS. 6a, 6b and 7a, 7b in succession, it may be seen that opening 7 may also be provided by means of a change of position of a blade section 6'a, 6'b on parallel helices, for example rearward (FIG. 6b) or forward (FIG. 7b) relative to direction A of rotation of rotor 5.

Lastly, FIGS. 8a, 8b show a four-bladed rotor of which two 9a, 9b are short and two 10a, 10b are long, openings 7 being delimited by long-bladed sections 10'a, 10'b which are separated according to the same helix of blade-section 10a, 10b originating from the flank and simultaneously moved relative to the latter on a parallel helix, thus combining both the split according to the same helix and the movement on parallel axes. In the particular case of FIGS. 8a, 8b the movement is effected rearward relative to direction A of rotation.

The examples illustrated in the figures refer to tangential rotors of non-interpenetrating type, but it is quite obvious that the particular configurations of split-blade rotors according to this invention may also be applied, in a manner obvious to an expert in the field, to other types of rotor, including for example those of interpenetrating type.

It is therefore clear from the description of examples of implementation given above that many alternatives may be introduced in the angular arrangement, length, number of blades and constructional details of the various parts comprising the invention without thereby departing from the scope of this specification in regard to its general features as claimed hereinafter.

I claim:

1. A rotor particularly for mixing machines of the internal type for elastomers and plastomers, comprising at least one pair of blades each projecting from a cylindrical hub of the rotor starting from a flank of the rotor and set helically thereon, wherein at least one of said blades is split into at least two blade sections located parallel to one another, one of said sections having one of its ends located at the flank of the rotor and at least a second section being separated from the said one section and located on the same helix thereof to create at least one opening capable of bringing about diversion of the flow of material through the opening during mixing.

2. A rotor particularly for mixing machines of the internal type according to claim 1, wherein the blade sections detached from the flank of the rotor are remote from the blade section having one end located at the flank lying on the same helix of the detached blade section.

3. A rotor particularly for mixing machines of the internal type according to claim 1, wherein the blade sections remote from the flanks are moved according to the same helix of the blade section having its end located at the flank of the rotor.

4. A rotor particularly for mixing machines of the internal type for elastomers and plastomers, comprising at least one pair of blades, each projecting from a cylindrical hub of the rotor starting from a flank of the rotor and set helically thereon, wherein at least one of said blades is split into at least two blade sections located parallel to one another, one of said sections having one of its ends located at the flank of the rotor and at least a second section being separated from the said one section and located on parallel helices thereto to create at least one opening capable of bringing about diversion of the flow of material during mixing.

5. A rotor particularly for mixing machines of the internal type according to claim 4, wherein the blade sections remote from the flank are moved relative to a direction of rotation of the rotor on a helix parallel to that of the blade section having its end located at the flank.

6. A rotor particularly for mixing machines of the internal type according to claim 4, wherein the blade sections remote from the flank are moved on helices located parallel in the sense corresponding to a direction of rotation of the rotor.

7. A rotor particularly for mixing machines of the internal type according to claim 4, wherein the blade sections remote from the flanks are moved on helices located parallel in the sense contrary to a direction of rotation of the rotor.

8. A rotor particularly for mixing machines of the internal type according to claim 4, wherein the blade sections remote from the flanks are moved according to a helix parallel to that of the blade section having its end located at the flank of the rotor.

* * * * *